Figure 1:
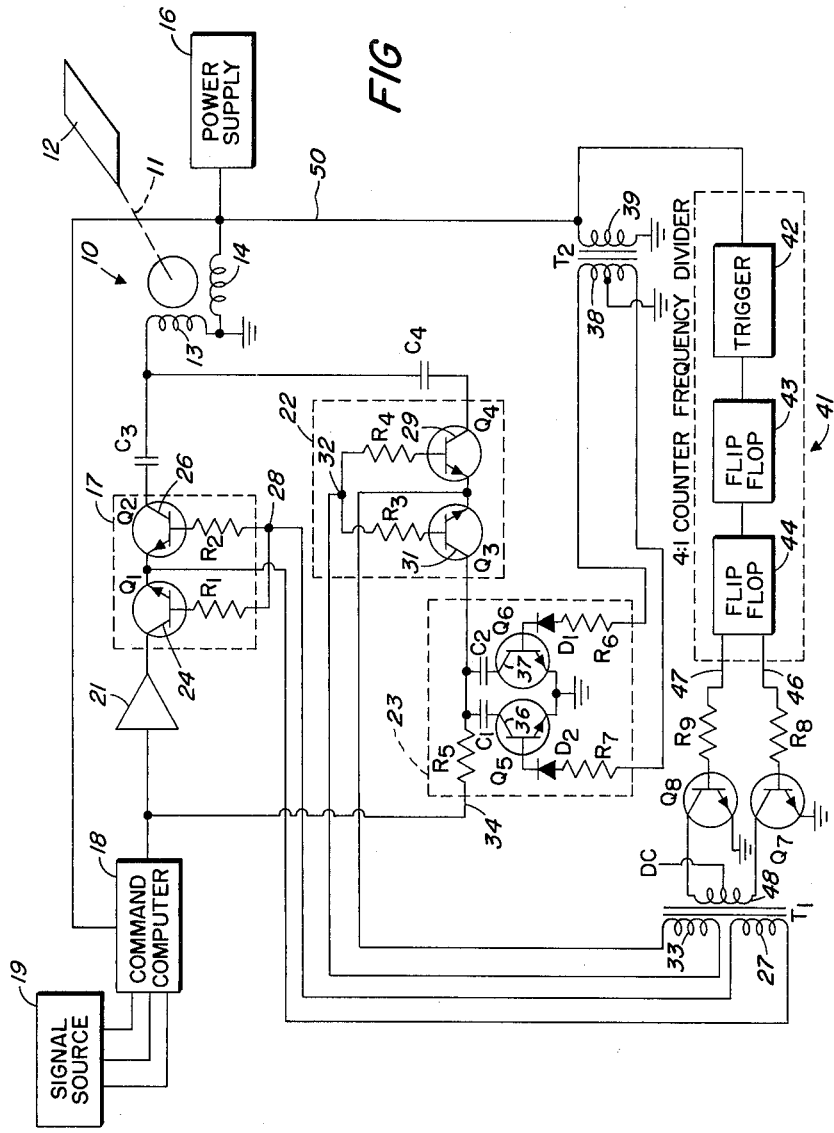

Oct. 12, 1965  M. H. RHODES  3,211,974
SERVO SYSTEM WITH RATE FEEDBACK
Filed Aug. 29, 1963  2 Sheets-Sheet 1

INVENTOR.
MELVIN H. RHODES
BY *Marvin Moody*
ATTORNEY

Oct. 12, 1965   M. H. RHODES   3,211,974
SERVO SYSTEM WITH RATE FEEDBACK
Filed Aug. 29, 1963   2 Sheets-Sheet 2

INVENTOR.
MELVIN H. RHODES
BY
ATTORNEY

United States Patent Office 3,211,974
Patented Oct. 12, 1965

3,211,974
SERVO SYSTEM WITH RATE FEEDBACK
Melvin H. Rhodes, Cedar Rapids, Iowa, assignor to Collins Radio Company, Cedar Rapids, Iowa, a corporation of Iowa
Filed Aug. 29, 1963, Ser. No. 305,312
4 Claims. (Cl. 318—18)

This invention relates in general to servo systems and in particular to a servo system rate feedback which derives the rate signal from the servo motor.

Conventional servo systems oftentimes use rate feedback for stability purposes and it is conventional to produce a rate signal with a rate generator which is connected to the output shaft of the servo motor. Quite often servo motors and rate generators are constructed as a unitary unit.

It is an object of the present invention to eliminate the conventional rate generator and provide a switching circuit in combination with a servo motor which allows the servo motor to function as a motor part of the time, and as a rate generator at other times.

Another object of the invention is to eliminate the rate generator normally associated with a servo system.

A feature of this invention is found in the provision for a servo motor which receives a command signal through a switching circuit and which operates as a servo motor when the switch is closed and which operates as a rate generator when the switch is open to produce a rate feedback signal. The rate feedback signal is stored and supplied with the command signal to the servo motor when the switch is closed.

Figure 2:
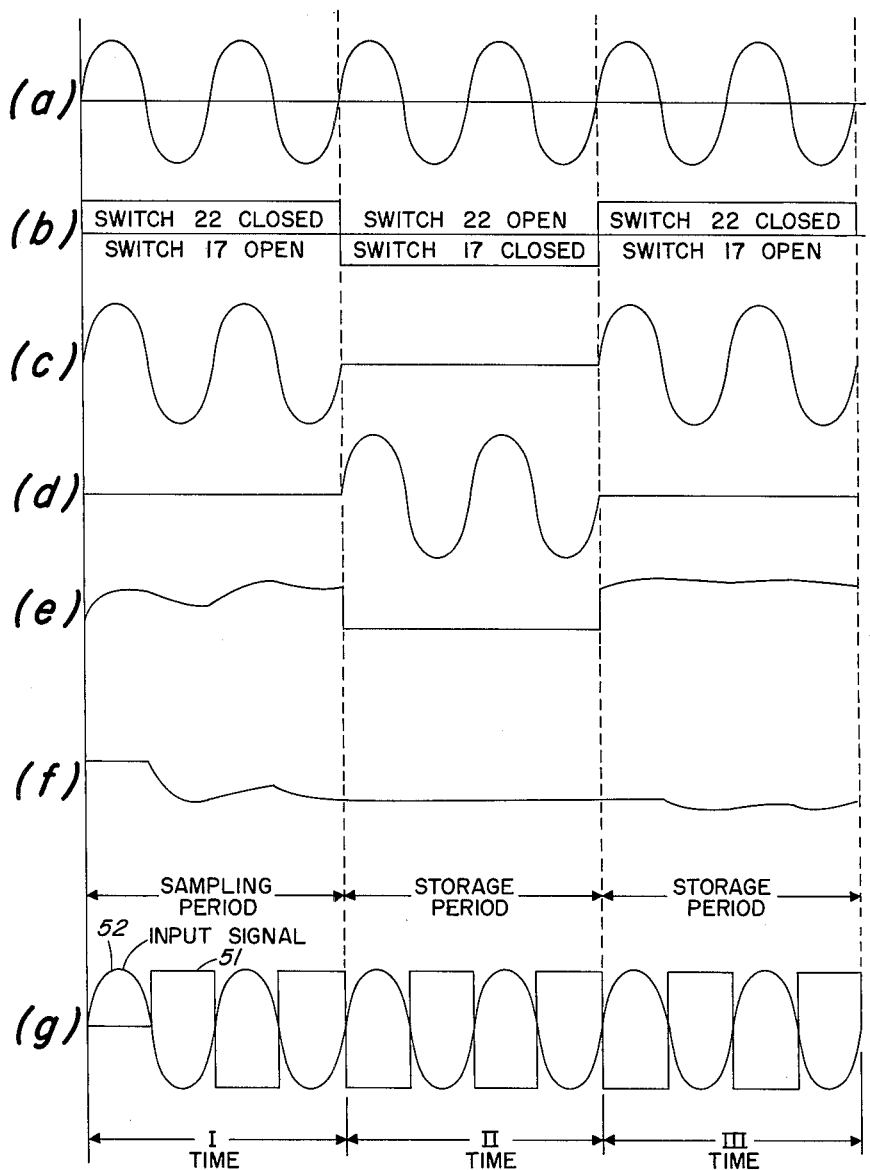

Further features, objects and advantages of the invention will become apparent from the following description and claims when read in view of the drawing in which:

FIGURE 1 is a schematic view of the servo system according to this invention; and FIGURES 2, A–G, illustrate waveforms.

FIGURE 1 illustrates a servo motor designated generally as 10 which has an output shaft 11 which is connected to a controlled element 12. The controlled element might be, for example, the ailerons of an aircraft. The motor 10 is illustrated as a two phase motor which has an input winding 13 and a reference winding 14. Windings 13 and 14 have one of their ends connected together and to ground. Reference winding 14 is connected to a main power supply 16 which might be, for example, a 400 cycle per second power supply normally used on aircraft. The control winding 13 is connected to a capacitor $C_3$ and to a first switching circuit 17.

A command computer 18 receives inputs from various signal sources 19 carried on the aircraft. Such sources might include gyros, compasses, radios and accelerometers. The output of command computer 18 is supplied to a servo amplifier 21. The output of the servo amplifier 21 is connected to input of the first switching means 17.

The control winding 13 is also connected to condenser $C_4$ which is in turn connected to a second switching means 22. The output of the second switching means 22 is connected to a memory and transport filter 23. The output of the memory and transport filter 23 is connected to the servo amplifier 21.

The first switching means 17 comprises a pair of transistors $Q_1$ and $Q_2$ which have their emitters connected together. The collector 24 of transistor $Q_1$ is connected to the output of the amplifier 21. Collector 26 of transistor $Q_2$ is connected to condenser $C_3$. The bases of transistors $Q_1$ and $Q_2$ are connected respectively to resistors $R_1$ and $R_2$. The other sides of resistors $R_1$ and $R_2$ are connected together.

A transformer $T_1$ has a first secondary winding 27 which has opposite ends connected respectively to junction point 28 of resistors $R_1$ and $R_2$ and to the common emitters of transistors $Q_1$ and $Q_2$.

The second switching circuit 22 comprises a pair of transistors $Q_3$ and $Q_4$ which have their emitters connected together. The collector 29 of transistor $Q_4$ is connected to condenser $C_4$ and the collector 31 of transistor $Q_3$ carries the output signal of the switching circuit. Resistors $R_3$ and $R_4$ are respectively connected to the bases of transistors $Q_3$ and $Q_4$ and have their opposite sides connected together at point 32. The second secondary winding 33 of transformer $T_1$ is connected between the common emitters of transistors $T_3$ and $T_4$ and point 32.

The memory transport filter 23 includes a pair of condensers $C_1$ and $C_2$ which are connected to the collector 31 of transistor $Q_3$. A resistor $R_5$ is also connected to the collector 31 of transistor $Q_3$. The other side of resistor $R_5$ is connected to a lead 34 which is the output of the memory transport filter 23.

A pair of transistors $Q_5$ and $Q_6$ have their emitters connected together and to ground. The collector 36 of transistor $Q_5$ is connected to the condenser $C_1$ and the collector 37 of transistor $Q_6$ is connected to capacitor $C_2$. The base of transistor $Q_6$ is connected to a diode $D_1$ which in turn is connected to a resistor $R_6$. The base of transistor $Q_5$ is connected to a diode $D_2$ which is in turn connected to a resistor $R_7$. The other sides of resistors $R_6$ and $R_7$ are connected to opposite ends of a secondary 38 of a transformer $T_2$. The center point of secondary 38 is connected to ground. One end of the primary 39 of transformer $T_2$ is connected to ground and the other end is connected to the main power supply 16. Main power supply 16 is also connected to a frequency divider 41 which, in the particular example shown, produces an output frequency which has one-fourth the frequency of the output of the power supply 16.

Frequency division is accomplished by a trigger circuit 42 and two conventional flip-flop circuits 43 and 44 in a conventional manner. For example, if the frequency of the power supply 16 is 400 cps., the output of the divider 41 will be at 100 cps. The output of the frequency divider 41 occurs at leads 46 and 47. Lead 46 is connected through a resistor $R_8$ to the base of a transistor $Q_7$. Lead 47 is connected through a resistor $R_9$ to the base of transistor $Q_8$. The emitters of transistors $Q_7$ and $Q_8$ are connected to ground and the collectors are connected to opposite ends of primary 48 of transistor $T_1$. A suitable D.C. bias is connected to the mid-point of primary 48.

In operation the signal sources 19 will produce command signals which will be fed to the command computer 18. Command computer 18 will compute a command signal and furnish it to the servo motor 10 through servo amplifier 31 and the first switching means 17. At the same time a rate signal which has been generated by the control winding 13 at alternate time intervals and passed through the second switching means 22 to the memory and transport filter 23 will be fed into the servo amplifier 21 through lead 34. This signal will also be supplied to control winding 13 of servo motor 10. Secondary windings 27 and 33 of transformer $T_1$ alternately switch the first and second switching means on and off at a 100 cycle rate in a particular example wherein the power supply 16 produces a 400 cps. output and the divider 41 divides by a factor of four. The ouput appearing on lead 34 is proportional to rate and is 400 cycle A.C. in that the transistors $Q_5$ and $Q_6$ are energized from the secondary 38 of the transformer $T_2$ which has its primary connected to the 400 cycle power supply.

FIGURE 2A illustrates, by way of example, the output of the power supply 16 which is supplied to the command computer 18 by the lead 50 to primary 39 of transformer $T_2$ and to the divider circuit 41. Divider 41 divides the frequency of the power supply by a factor of four and the secondaries 27 and 33 switch the first and second switching means, as shown in FIGURE 2B.

FIGURE 2C shows the output of control winding 13 when switch 22 is closed and switch 17 is open. Winding 13 produces an induced voltage due to the rotation of the rotor of the servo motor which is supplied to the capacitors $C_1$ and $C_2$ through switch 22.

FIGURE 2D illustrates the input signal to winding 13 when switch 17 is closed and switch 22 is open. It is to be realized that FIGURE 2D represents only the output of the command computer and does not include the rate signal.

FIGURE 2E illustrates the voltage characteristic of the condenser $C_1$, and FIGURE 2F illustrates the voltage characteristic of the condenser $C_2$. For example, in FIGURE 2E transistor $Q_5$ first conducts during positive half cycles at wave form C such that capacitor $C_1$ charges toward the peak positive voltage. During the ensuing negative half cycle, transistor $Q_5$ is nonconductive and capacitor $C_1$ discharges slightly through high resistance $R_5$. The next positive half cycle charges $C_1$ to the peak positive level of wave form C.

Alternately, transistor $Q_6$ is rendered conductive during the negative half cycles of the voltage across secondary 38 during which period capacitor $C_2$ charges toward the negative peak of wave form C through transistor $Q_6$. During the ensuing positive half cycle, capacitor $C_2$ discharges slightly through the high resistance $R_5$. FIGURE 2F illustrates the voltage across condenser $C_2$ as a function of time.

Wave form 2G illustrates the rate feedback signal appearing at lead 34 and the command signal produced by the command computer 18. The rate feedback signal is curve 51 and the command signal is curve 52. These are combined at point A and supplied through the servo amplifier 21 to control winding 13. The motor runs in response to the combined signal.

It is to be realized that during the time interval I switch 17 is open and the rotor of the motor is coasting to produce the rate signal. This rate signal is stored in circuit 23 and added to the command signal at point A during time interval II at which time switch 17 is closed and the command plus rate signal is fed to the control winding 13.

The system thus allows rate feedback in an alternating current servo system without the use of a separate rate generator. The switching is at a submultiple of the reference frequency such that during the rate sampling periods I, the capacitors $C_1$ and $C_2$ are more than one cycle of the 400 c.p.s. rate to sample and will have ample time to charge to the peaks before being read out during the time intervals II.

The invention has been described with respect to a preferred embodiment. However, various changes may be made without departing from the spirit or the scope of the invention as defined by the appended claims.

I claim:

1. A servo system which eliminates the requirement for a rate generator comprising a servo motor with an energizing winding and a reference winding, a command signal computer, a first switch connected between the command computer and the energizing winding of the servo motor, a power supply connected to the reference winding of the servo motor and the command signal computer, a second switch connected to the energizing winding, a memory circuit connected to the output of the second switch, the output of the memory device connected to the input of the first switch, and a timing circuit comprising a divider circuit to receive an input from the power supply and divided into a submultiple frequency, said divider circuit being connected to the first and second switch circuits to alternately turn said switches on and off.

2. In apparatus according to claim 1 wherein said memory circuit comprises a capacitive means and receives an input through the second switch when the second switch is closed and supplies an input to the energizing means when the first switch is closed.

3. In apparatus according to claim 1 where said memory circuit comprises a pair of condensers connected in circuit with transistors which are biased by the output of the power supply such that one of the condensers charges to positive peaks and the other condenser to the negative peaks when the second switch is closed and discharges through the first switch when it is closed.

4. In apparatus according to claim 3 wherein a relatively high resistance is connected in series between the first and second condensers and the first switch.

References Cited by the Examiner

UNITED STATES PATENTS 2,471,422   5/49   Frost _____ 318—30

JOHN F. COUCH, *Primary Examiner.*